US006560724B1

(12) United States Patent
Ganske

(10) Patent No.: US 6,560,724 B1
(45) Date of Patent: May 6, 2003

(54) RANDOM MESSAGE VERIFICATION TECHNIQUE

(75) Inventor: David L. Ganske, Shoreview, MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/408,968

(22) Filed: Sep. 29, 1999

(51) Int. Cl.$^7$ ................................................ H02H 3/05
(52) U.S. Cl. ........................ 714/43; 714/736; 324/770; 348/184
(58) Field of Search ............................. 714/43, 28, 46, 714/48, 732, 736; 324/770; 348/184

(56) References Cited

U.S. PATENT DOCUMENTS 5,652,908 A * 7/1997 Douglas et al. ............. 709/220
5,737,518 A * 4/1998 Grover et al. ................ 714/38
6,195,765 B1 * 2/2001 Kislanko et al. ............. 703/22
6,401,223 B1 * 6/2002 DePenning .................. 711/112

* cited by examiner

*Primary Examiner*—Robert Beausoliel
*Assistant Examiner*—Rita A Ziemer
(74) *Attorney, Agent, or Firm*—Charles A. Johnson; Mark T. Starr; Nawrocki, Rooney & Sivertson, PA

(57) ABSTRACT

An apparatus for and method of automatically generating, transmitting, receiving, and verifying test request messages within a large scale resource sharing computer system. In the preferred mode, the testing technique is applied to a memory resource having up to four requester ports. The test messages are simultaneously but randomly generated within each of the requester ports. These test messages are transferred to the memory resource. The responses from the memory resource are automatically verified within each of the receiving requester ports.

18 Claims, 4 Drawing Sheets

| Container Number | Message Data Format |
|---|---|
| 0 | Fixed pattern |
| 1 | Fixed pattern |
| 2 | Sent_to port 0 counter |
| 3 | Sent_to port 1 counter |
| 4 | Sent_to port 2 counter |
| 5 | Sent_to port 3 counter |
| 6 | Fixed pattern |
| 7 | Fixed pattern |

FIG. 2

RANDOM MESSAGE VERIFICATION TECHNIQUE

CROSS REFERENCE TO CO-PENDING APPLICATIONS

None.

BACKGROUND OF THE INVENTION

1. Field of the Invention

The present invention generally relates to digital data processing systems and more particularly to techniques for testing access to a shared resource having a plurality of resource requesters.

2. Description of the Prior Art

The earliest computer systems generally employed a single processor, single memory, and single peripheral equipments of various rudimentary types. As systems became more complex, additional peripherals were added, prompting some switching functions provided by an input/output controller. Further complexities produced systems having multiple memory modules. Oftentimes, multiple computers were coupled together to perform larger tasks which could be parsed into two or more parallel functions. By providing for peripheral sharing and intercomputer input/output, such multiple computer systems became primitive multiple processor systems.

Today, even the simplest forms of general purpose computers have some modularity permitting customization through the addition of memories, input/output channels, etc. The most complex of current day computers employ multiple processors which share multiple memories, input/output controllers, and other resources.

Testing of early computers involves determining whether the various components function as intended. Does the processor properly execute each defined instruction? Does the memory properly store data? Do each of he input/output devices function as specified?

Similarly, testing of large modem multiprocessor systems requires exercising each of the components to ascertain that each module functions as intended. However, even though this type of testing is necessary, it is not sufficient. Because of the multiple user/multiple shared resource environment, substantial testing of intercomponent communication is also required. Not only is it important to verify that each user can properly communicate with each resource, it is absolutely necessary to show that all users can communicate with all resources, as simultaneously as permitted by the priority scheme.

This type of testing becomes very complex, because it needs to randomly (or pseudo-randomly) perform functional testing and assessment from the perspective of multiple users and multiple resources. In the past, this has necessitated specialized test equipment driven by laboriously defined test patterns followed by time consuming manual analysis of the results.

SUMMARY OF THE INVENTION

The present invention overcomes many of the disadvantages found within the prior art by providing apparatus for and a method of testing intercomponent communication within a multiple user/multiple shared resource environment. In accordance with the technique of the present invention, intercomponent test messages are automatically generated consistent with a predefined format. The test messages are randomly transferred by the various different requesters to a shared resource. The present invention automatically verifies the responses received by the requesters from the shared resource.

Though the present invention is applicable to a general class of situations, the preferred mode is practiced within a Horizon mainframe computer system available from Unisys Corporation. In this system, the main memory storage unit is accessible by up to four asynchronous and independent ports. These ports serve as requesters on behalf of instruction processors, input/output processors, and other users. In ordinary operation, a port transmits a message to the main memory storage unit which specifies the requested service. The main memory storage unit decodes the message and honors the enclosed request in accordance with a predefined priority scheme. After honoring the request, the results are formatted as a message which is transferred to the port specified in the request.

The apparatus of the preferred mode of the present invention, generates test messages to be randomly transferred to the main memory storage unit by each of the available ports. As messages are received by the various ports from the main memory storage unit in response to the test messages, these responses are verified for proper operation and routing. Each of the requesters has counters which are incremented in a predefined fashion to provide uniqueness of the test messages within the sequence. Corresponding counters within the requesters permit the receiving requesters to create the anticipated response messages to enable verification. The present invention is structured to continuously generate test messages and verify responses until testing is terminated by the operator. A special error signal is produced whenever an unexpected response message is received.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 is a table showing the format of the test messages to be generated;

DETAILED DESCRIPTION OF THE PREFERRED EMBODIMENTS

Figure 1:
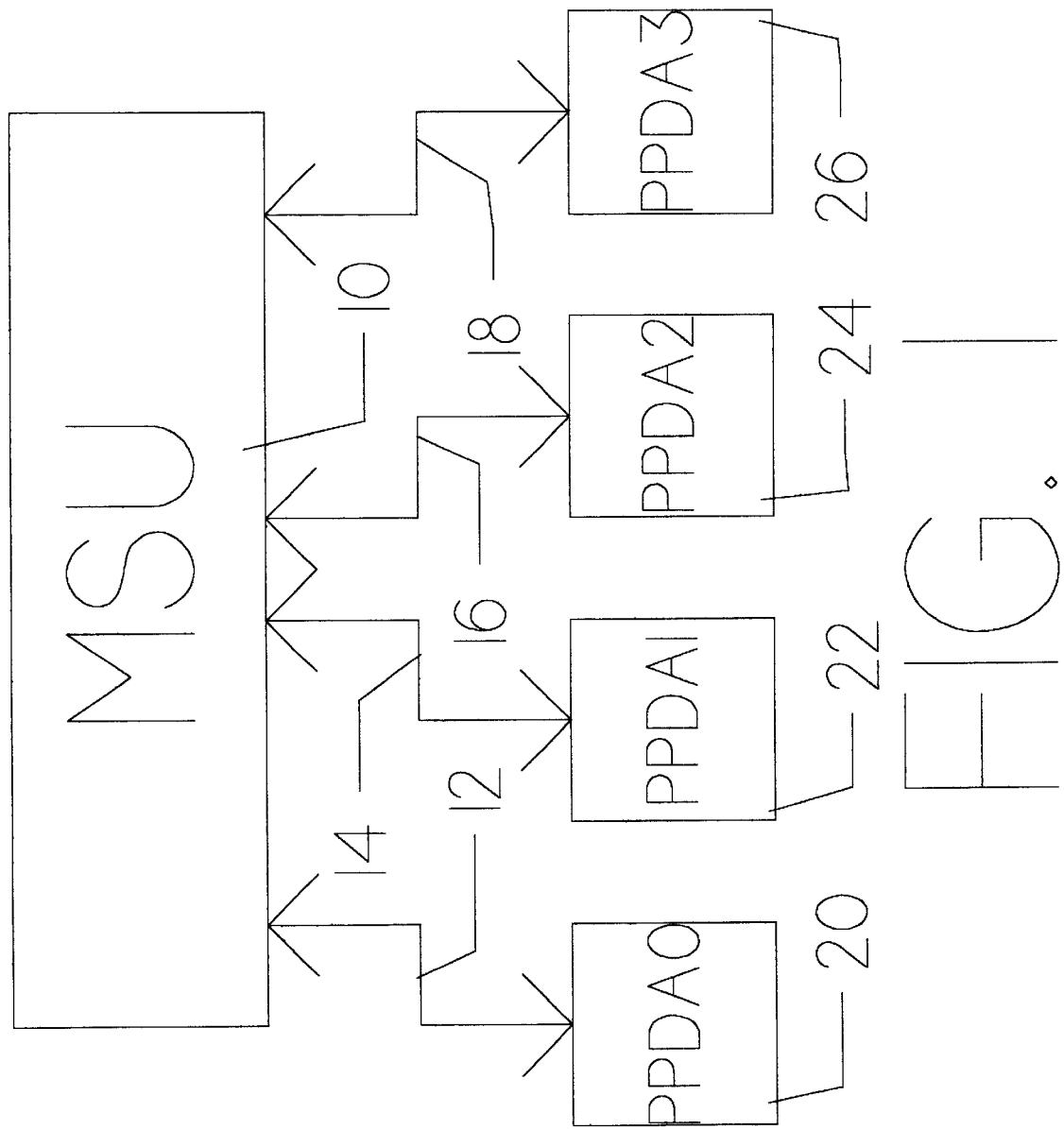
FIG. 1 is a block diagram showing the structure of the Horizon main memory storage unit configuration for practicing the preferred mode of the present invention.

FIG. 1 is a basic block diagram of the main memory request structure of the Horizon mainframe computer system, commercially available from Unisys Corporation. The architecture of this state of the art mainframe computer system includes memory storage unit (MSU) 10 which is basically word, cached, semiconductor storage bank. Each word is 36 bits in width. The instruction processors and many of the input/output devices of the Horizon system are based upon this 36-bit word format. Every access to the memory storage provides reading and/or writing of eight double word blocks. The read/write access to this storage is address interleaved to decrease average access time. MSU 10 has priority analysis and buffering facilities for up to four requesters. A more detailed explanation may be found in the above referenced, commonly assigned, co-pending, and incorporated U.S. Patent Application.

The four requester ports are PPDA0 20, PPDA1 22, PPDA2 24, and PPDA3 26 which are coupled to MSU 10 via bi-directional interfaces 12, 14, 16, and 18, respectively. Each of these ports services at least one user (not shown) which may be an instruction processor, input/output controller, or other user requiring main storage access. A request is formulated in a requester port in response to the need of a corresponding user. The formulated request is actually a message to MSU 10 having a predefined format. This message is received by MSU 10, decoded, queued for servicing, and eventually honored. A response message is formulated by MSU 10 and returned to the port specified in the service request message. Further details concerning the operation of a requester port may be found in the above referenced and incorporated U.S. Patent Application.

It can be readily appreciated that the basic operation of MSU 10 can be verified using standard memory testing techniques from a single requester port. Furthermore, these tests may be repeated for each requester port to fully test the interfaces. However, such testing does not completely exercise the priority logic, the queuing circuitry, and all of the message routing facilities.

Simultaneous, asynchronous, and random (or pseudo-random) testing must be performed from all requester ports to properly verify all functions under normal operating conditions. Unlike prior art techniques which manually generate requester messages and verify response messages, the present invention provides a technique for automatically generating random (or pseudo-random) requester messages and automatically verifying the corresponding response messages (see below).

FIG. 2 is a table defining the contents of the test requester messages to be automatically generated in accordance with the present invention. A requester message within the Horizon system consists of a 14-bit response field and eight 64-bit containers of data. The response field contains the information needed to determine where the message came from. With this invention, the eight 64-bit data containers are used to transfer the contents of message counters that a given PPDA uses to keep track of the number of messages it has sent to each of the other ports. Each PPDA has a "sent_to" counter, for each of the four destinations, and as a message is sent, one or more of these counters are incremented depending on which PPDA(a) are to receive the message. Then as the message is sent, the four "sent_to" counters are placed in four of the data containers as shown in FIG. 2.

Figure 3:
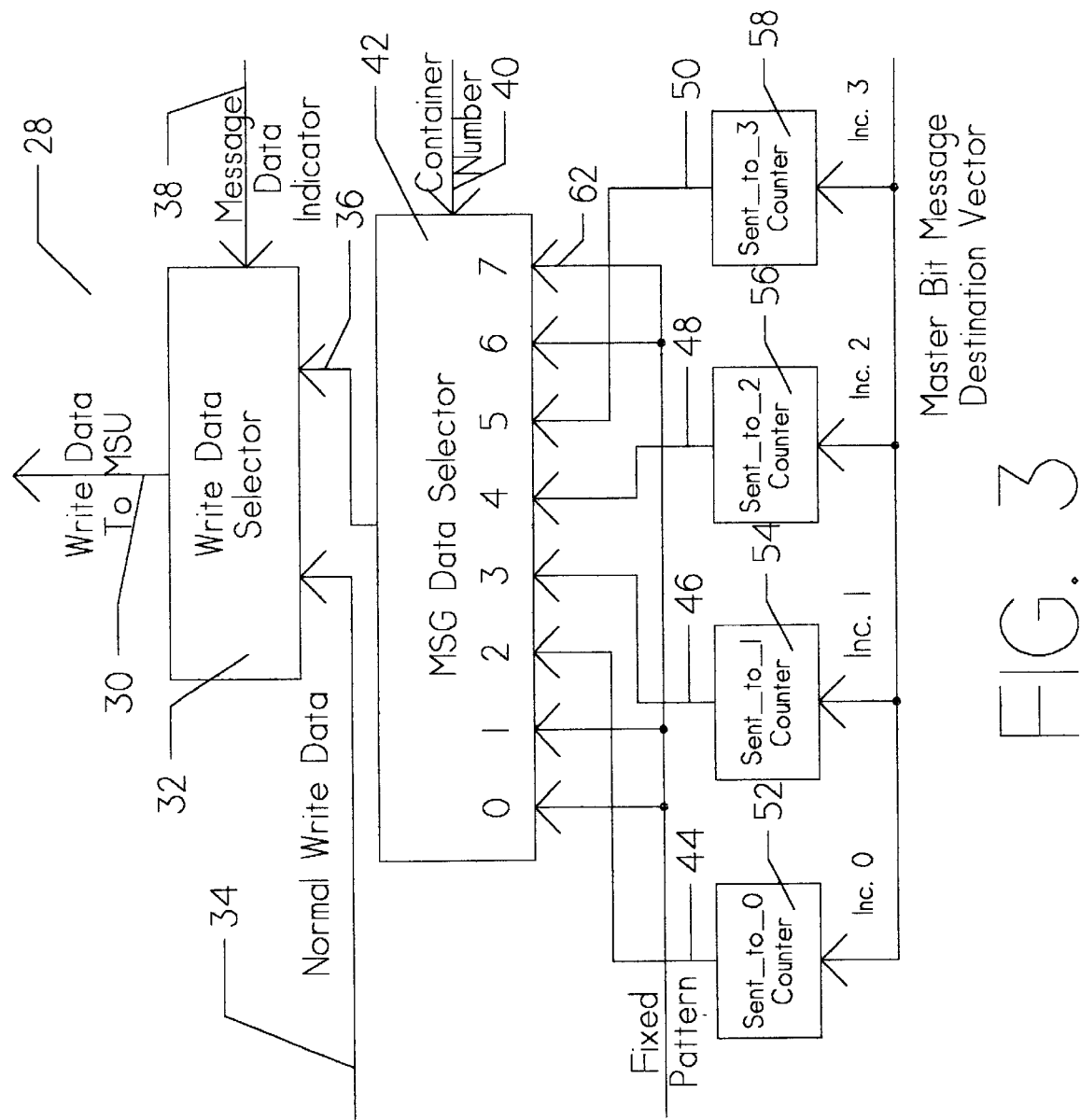
FIG. 3 is a detailed block diagram of the structure of the present invention involved in test message generation and transmission.

FIG. 3 is a detailed block diagram 28 showing the automatic generation and transmission of test messages within a PPDA. The test (and also normal) request messages are transferred via pathway 30 to the interface to MSU 10 (see also FIG. 1). Write data selector 32 (a two input/one output parallel multiplexer device) selects whether normal write data from path 34 or test message data from path 36 is to be transferred via pathway 30. Selection is based upon message data indicator 38 which permits changing from normal operation to test operation. The normal write data input is as described in the above identified U.S. Patent Application.

MSG data selector 42 provides for selection of the contents of the eight data containers for a given automatically generated test message. Sequencing of the data selection is made under the direction of container number 40, which is a two-bit selection value. Thus container number 40 defines selection of each of the eight inputs of MSG data selector 42.

A convenient fixed pattern is predefined. It is to be loaded into the first two and last two data containers (see also FIG. 2). It is suggested that these fixed patterns correspond to "worst data patterns" such as alternating ones and zeroes. The remaining four data container inputs (i.e., data container numbers 2, 3, 4, and 5) are received via paths 44, 46, 48, and 50, respectively. These correspond to the outputs of Sent_to_0 counter 52, Sent_to_1 counter 54, Sent_to_2 counter 56, and Sent_to_3 counter 58. The use of these counters provide unique identification for the messages sent to each of the PPDAs. These counters are incremented by the Master bit message destination vector signal as shown.

Figure 4:
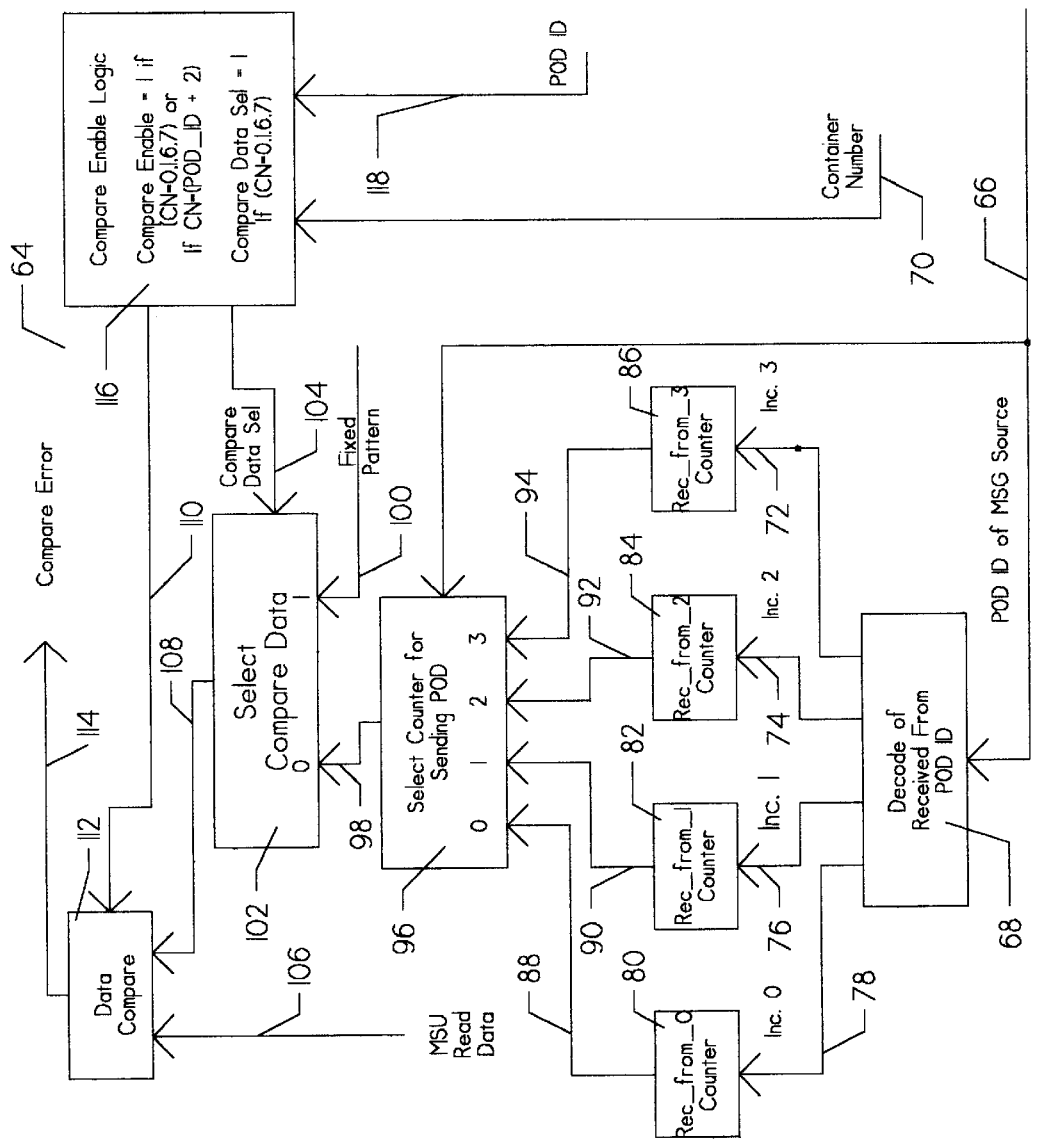
FIG. 4 is a detailed block diagram of the structure of the present invention involved in test message response verification.

FIG. 4 is a detailed block diagram showing the PPDA circuitry for automatically receiving the test messages and automatically verifying that the test messages were correct and correctly delivered. The response message is received by the PPDA from MSU 10 via the corresponding pathway (see also FIG. 1). The response message is divided into its two major component parts, the 14-bit response field and the eight 64-bit data containers. The first component part (i.e., the 14-bit response field) identifies the transmitter of the test message. This information is provided to line 118 as the POD ID and line 66 as the POD ID of MSG Source. The second component part (i.e., eight 64-bit data containers is provided on line 106 as MSU read data.

The POD ID of MSG Source is provided to decoder 68 to decode the source of the current message. The output of decoder 68 increments one of the Rec_from_counters (i.e., counters 80, 82, 84, and 86) via lines 78, 76, 74 or 72, respectively. This incrementation permits the receiving PPDA to determine which message is being received and the contents of that message for comparison purposes.

The Rec_from_counter outputs are transferred to selector 96 via lines 88, 90, 92, and 94, respectively. Selector 96 multiplexes the inputs to choose the counter output corresponding to the POD ID (i.e., transferring PPDA) on line 66 for presentation as a first input to selector 102 via line 98. The other input to selector 102 is the predetermined fixed pattern (see above) received via line 100. Using these inputs to selector 102, the correct contents of the second portion (i.e., data containers) received message can be created to compare with the actual received message.

Compare enable logic 116 controls the assembly of the created correct message by switching selector 102 to its first input (i.e., counter outputs) for container numbers 2–5 and to its second input (i.e., fixed pattern) for container numbers 0, 1, 6, and 7. The container number is determined by the position within the received message and is presented to compare enable logic 116 on line 70. The output of selector 102, applied to line 108, is thus the complete created data container portion of the message expected to be received.

Data compare 112 compares the second portion of the received message from line 106 with the created second portion of the expected received message from line 108. A compare error signal is generated and placed on line 114 if the second portions of the received message and created message are not identical. Timing control of data compare 112 is received via line 110 from compare enable logic, which enables a comparison only during the second portion of the message.

Having thus described the preferred embodiments of the present invention, those of skill in the art will readily appreciate that the teachings found herein may be applied to yet other embodiments within the scope of the claims hereto attached.

I claim:

1. In a data processing system having a shared resource coupled to a plurality of requesting users wherein said plurality of requesting users generate service requests and said shared resource generates responses corresponding to said service requests, the improvement comprising:
   a. At least one test request message generator located within said plurality of requesting users which automatically generates a sequence of test request messages wherein each of said sequence of test request messages is different; and
   b. At least one test response message verifier located within said plurality of requesting users which verifies a test response message received from said shared resource.

2. The improvement according to claim 1 wherein more than one of said plurality of requesting users has one of said at least one test request message generator.

3. The improvement according to claim 2 wherein more than one of said plurality of requesting users has one of said at least one test response message verifier.

4. The improvement according to claim 3 wherein each of said plurality of requesting users has one of said at least one test request message generator and one of said at least one test response message verifier.

5. The improvement according to claim 4 wherein said shared resource is a memory storage unit.

6. An apparatus comprising:
   a. A shared resource for receiving service requests and providing corresponding responses;
   b. A plurality of requesters which issue service requests and receive corresponding responses;
   c. A plurality of test request generators wherein one of said plurality of test request generators is located within each of said plurality of requesters; and
   d. A plurality of test response verifiers wherein one of said plurality of test response verifiers is located within each of said plurality of requesters wherein each of said plurality of test request generators and said plurality of test response verifiers operates continuously until manually terminated.

7. An apparatus according to claim 6 wherein each of said sequence of test request messages is different.

8. An apparatus according to claim 7 wherein each of said plurality of test response verifiers issues an error signal if it receives an incorrect test response.

9. An apparatus according to claim 8 wherein said shared resource further comprises a memory storage unit.

10. An apparatus according to claim 9 wherein said memory storage unit is a Unisys Horizon memory storage unit.

11. A method of testing a shared resource within a data processing system comprising:
   a. Automatically generating a sequence of test service requests in each of a plurality of requesters sharing said shared resource wherein each of said test service requests within said sequence of test service requests is different;
   b. Transferring each of said sequence of said sequence of test service requests to said shared resource;
   c. Honoring each of said sequence of test service requests within said shared resource to produce a sequence of corresponding responses;
   d. Transferring each of said corresponding responses to an appropriate one of said plurality of requesters; and
   e. Automatically verifying that each of said corresponding responses is correct.

12. A method according to claim 11 further comprising:
   f. Producing an error signal if said verifying step determines that said corresponding response is incorrect.

13. A method according to claim 12 wherein said generating step places within each test service request an indication the position of each of said test service request within the said sequence of test service requests.

14. A method according to claim 13 wherein said method continues until manually terminated.

15. An apparatus comprising:
   a. Shared means for receiving service requests and providing corresponding responses;
   b. Plurality of means coupled to said shared receiving and providing means for generating said service requests and receiving said corresponding responses wherein said plurality of generating and receiving means further comprise Unisys Horizon memory storage unit access ports;
   c. Means located within each of said plurality of generating and receiving means for producing a sequence of test service requests; and
   d. Means located within each of said plurality of generating and receiving means for verifying correctness of said corresponding responses.

16. An apparatus according to claim 15 wherein said shared receiving and providing means further comprises a memory storage unit.

17. An apparatus according to claim 16 wherein said memory storage unit further comprises a Unisys Horizon memory storage unit.

18. An apparatus according to claim 17 wherein said verifying means further comprises means for creating an error signal if said corresponding response is incorrect.

* * * * *